US010817312B2

(12) United States Patent
Shukla et al.

(10) Patent No.: US 10,817,312 B2
(45) Date of Patent: Oct. 27, 2020

(54) PROGRAMMING MODEL FOR PERFORMANT COMPUTING IN DOCUMENT-ORIENTED STORAGE SERVICES

(71) Applicant: Microsoft Technology Licensing, LLC, Redmond, WA (US)

(72) Inventors: Dharma Shukla, Bellevue, WA (US); Madhan Gajendran, Bellevue, WA (US); Quetzalcoatl Bradley, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 535 days.

(21) Appl. No.: 13/827,917

(22) Filed: Mar. 14, 2013

(65) Prior Publication Data

US 2014/0282392 A1 Sep. 18, 2014

(51) Int. Cl.
*G06F 9/44* (2018.01)
*G06F 9/448* (2018.01)
*G06F 9/455* (2018.01)

(52) U.S. Cl.
CPC .......... *G06F 9/449* (2018.02); *G06F 9/45529* (2013.01)

(58) Field of Classification Search
CPC ........ G06F 9/4433; G06F 9/4428; G06F 8/20; G06F 8/315; G06F 8/24; G06F 9/443;
(Continued)

(56) References Cited

U.S. PATENT DOCUMENTS 5,920,725 A * 7/1999 Ma et al. ...................... 717/171
8,332,815 B2 12/2012 Balfe
(Continued)

OTHER PUBLICATIONS

Joseji, Lijin.; "11 Open NoSQL Document-Oriented Databases". http://architects.dzone.com/articles/11-open-nosql-document Published Date: Jul. 22, 2012 pp. 1-4.
(Continued)

*Primary Examiner* — Lewis A Bullock, Jr.
*Assistant Examiner* — Tina Huynh
(74) *Attorney, Agent, or Firm* — Alleman Hall Creasman & Tutttle LLP

(57) ABSTRACT

Object-oriented application languages often provide resources to applications for accessing objects stored in the volatile application memory region, and, separately, for packaging objects for persistent storage and network transport by serialization and deserialization involving a storage format. However, this design creates discrepancies between the application language and storage format, and depends on affirmative serialization and deserialization by the application. Presented herein are techniques for providing object access to objects involving persisting the objects as documents in a document store, where such persistence occurs automatically upon object creation and updating, and where such objects are stored in a language format integral to the application language (e.g., when a JavaScript application creates an object, the objects are automatically stored as documents of the document store in a JavaScript Object Notation (JSON) format). This design enables various advantages in efficiency, flexibility, and seamless interaction between the application and the objects.

20 Claims, 9 Drawing Sheets

(58) Field of Classification Search
CPC .......... G06F 8/36; G06F 3/04883; G06F 8/10;
G06F 8/31; G06F 8/311; G06F 8/34;
G06F 8/38; G06F 8/423; G06F 9/449;
G06F 9/45529
USPC .......................................... 717/108, 114, 116
See application file for complete search history.

(56) References Cited

U.S. PATENT DOCUMENTS

| | | | | |
|---|---|---|---|---|
| 8,533,665 | B2* | 9/2013 | Yu et al. ........................ | 717/108 |
| 2008/0140724 | A1* | 6/2008 | Flynn ...................... | G06F 1/183 |
| 2009/0240698 | A1* | 9/2009 | Shukla .............. | G06F 17/30286 |
| 2010/0211572 | A1 | 8/2010 | Beyer | |
| 2010/0293529 | A1* | 11/2010 | Austin et al. ................. | 717/113 |
| 2011/0085667 | A1* | 4/2011 | Berrios et al. ................. | 380/282 |
| 2011/0119652 | A1* | 5/2011 | Yu .......................... | G06F 9/4428 |
| | | | | 717/108 |
| 2011/0282911 | A1* | 11/2011 | Salvatore .......... | G06F 17/30778 |
| | | | | 707/792 |
| 2011/0289479 | A1* | 11/2011 | Pletter ............... | G06F 17/30575 |
| | | | | 717/122 |
| 2012/0036516 | A1* | 2/2012 | Chang .................... | G06F 9/548 |
| | | | | 719/316 |
| 2012/0054596 | A1* | 3/2012 | Kroger ................ | G06F 17/3089 |
| | | | | 715/234 |
| 2012/0117075 | A1* | 5/2012 | Gokulakannan ............................ | G06F 17/30445 |
| | | | | 707/741 |
| 2012/0174063 | A1* | 7/2012 | O'Carroll ............. | G06F 9/5055 |
| | | | | 717/116 |
| 2012/0233522 | A1* | 9/2012 | Barton .................... | H04L 67/06 |
| | | | | 714/758 |
| 2012/0330954 | A1* | 12/2012 | Sivasubramanian ........................ | G06F 9/5061 |
| | | | | 707/737 |

OTHER PUBLICATIONS

"Document-Oriented Databases with MongoDB". http://blog.safaribooksonline.com/2012/12/18/document-oriented-databases-with-mongodb/ Published Date: Dec. 18, 2012 pp. 1-5.
"JSON Storage as Hypergraph Structures". http://www.hypergraphdb.org/learn?page=Json&project=hypergraphdb Retrieved Date: Feb. 20, 2013 pp. 1-5.
"Loading and Saving JSON data". http://knockoutjs.com/documentation/json-data.html Retrieved Date: Feb. 20, 2013 pp. 1-3.
Sporny, Manu., et al.; "A Context-based JSON Serialization for Linking Data". http://json-Id.org/spec/ED/json-Id-syntax/20111023/ Published Date: Oct. 24, 2011 pp. 1-56.

* cited by examiner

PROGRAMMING MODEL FOR PERFORMANT COMPUTING IN DOCUMENT-ORIENTED STORAGE SERVICES

BACKGROUND

Within the field of computing, many scenarios involve the execution of an application written in an application language and utilizing a set of objects, often comprising a structured set of member fields respectively having a value. The objects are often created, read, updated, and deleted by the application in a volatile application memory (such as an application stack) to store and structure data in furtherance of various application tasks. Additionally, the application may request to persist the objects in a persistent object store, such as a Structured Query Language (SQL) database or a file encoded in a human-readable or human-unreadable storage format. This persistence is often achieved by "serializing" the object, wherein respective fields of the object are converted from an in-memory representation to the storage format (e.g., creating an extensible markup language (XML) representation of the object identifying its name, type, and size, in addition to its value), and writing the serialized object to the persistent object store. The application may also request to read objects from the persistent object store, which is achieved by "deserializing" the object (e.g., converting the stored fields in the storage language to an in-memory representation of the object). The serialization and deserialization processes are also used to send an object stored in the volatile application memory over a network and/or to receive an object sent over the network by another device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Application languages that enable the use of objects often present some disadvantages. As a first example, the storage language is often significantly different from the application language, and the process of serializing or deserializing the object involves a significant conversion of the structure and contents of the object. While these conversion processes may be automated, some efficiency is lost and complexity added by the discrepancies between the storage format and the application language. As a second example, the persistence of the objects is typically achieved only through a direct, explicit request by the application to store the objects, such as an invocation of a serializer or a function of an application programming interface (API) to package one or more objects for storage or network transport. This persistence thus involves logic in the application for loading and saving objects, possibly entailing further logic for more related tasks, such as identifying the storage location and synchronizing the in-memory representation of an object with the stored representation of the object. As a third example, if the objects are stored by a remote data store, the execution of the application on the local device may involve retrieving the object, locally executing one or more operations on the object, and then sending the modified object back to the remote data store. It may be more efficient to send the operations involving the object to the remote data store for execution, and to automate the determination of this decision, but such flexibility may not be enabled by the application, the application language, the local device, and/or the remote data store.

Presented herein are techniques for representing the objects of an application in a more flexible manner that may address some of these limitations of conventional object systems. In accordance with these techniques, the objects are represented in a language format that is tightly bound to the application, such as in the JavaScript Object Notation (JSON) format comprising a familiar and integral subset of the JavaScript language. The objects are also stored in documents in a document store, which may be stored locally, distributed over a set of remote data stores, or a combination thereof. Moreover, requests by the application to create, update, or delete objects in the application memory automatically result in the creation, updating, or deletion of the corresponding document in the document store, rather than involving a separate, explicit request by the application to persist such objects in storage. These techniques therefore enable a more natural and seamless interaction between the application, the objects, the storage subsystems of the local device, and remote data stores than are achievable through conventional techniques of application objects.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
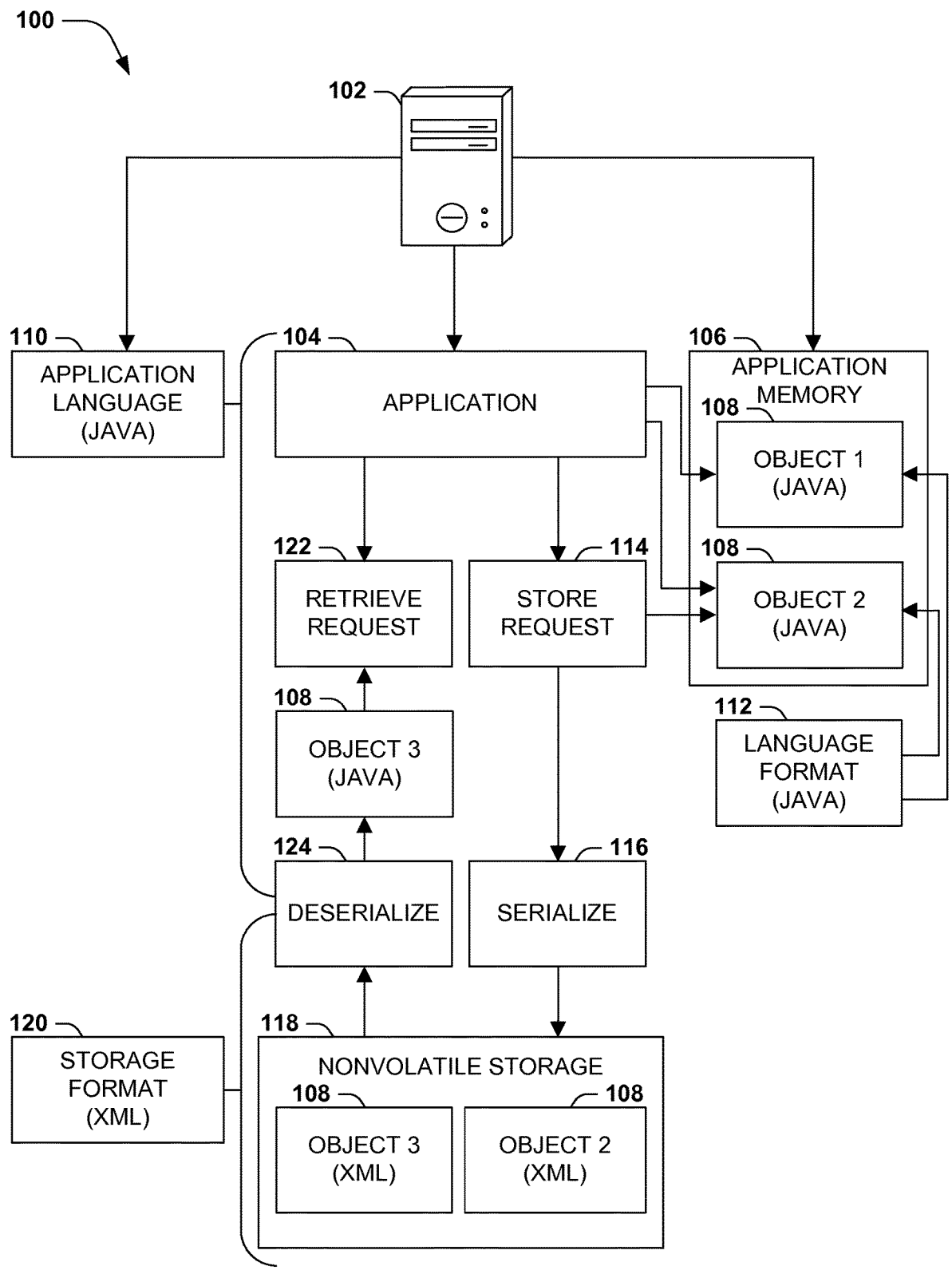
FIG. 1 is an illustration of an exemplary scenario featuring an application object architecture enabling the persistence of objects in an object store.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve an execution of an application on a device, where the application creates, reads, updates, and/or deletes a set of objects. Often, the objects comprise a set of member fields storing various types of data (e.g., Boolean values, numbers, strings, and memory addresses of related objects), and/or pointers to a set of invokable functions. The objects are created in a volatile application memory allocated for the application, such as a stack or heap allocated for the application in system random-access memory (RAM), which enables rapid access to the objects, but which is deallocated when the application exits. In order to persist one or more objects beyond the application life cycle, the application may request to write the objects to nonvolatile, persistent storage (e.g., a platter of a hard disk drive, a solid-state storage device, or a magnetic or optical disc). The device may therefore "serialize" the object by converting respective member fields of the object into a storage format, that is not dependent on the ephemeral details of the application memory. For example, the objects may be stored in a binary format that is rapidly accessible but not human-readable, or in the Extensible Markup Language (XML), wherein a set of objects is stored in a textual, human-readable manner. The application or another application may thereafter initiate a request to load the object from persistent storage into the application memory, and a "deserialization" of the object in persistent storage may be performed, including translating the storage format representation of the object into the application format used in the application memory. Similar processes may be utilized to deliver the application over a network connection to a remote data store.

FIG. 1 presents an illustration of an exemplary scenario 100 featuring a device 102 executing an application 104. The device 102 comprises a volatile memory store, such as a system random access memory (RAM) device, and while initiating an instance of the application 104, the device allocates an application memory 106 for the application 104 where various blocks of memory may be allocated and used (e.g., a call stack storing a set of stack frames to facilitate a sequence of function invocations, and an unordered space where working data may be utilized). In particular, the application memory 106 may be used to store a set of objects 108 used by the application 104, respectively comprising one or more member fields and organized according to a particular data structure (such as a key/value store or a member sequence specified by a class definition of the object 108). The application 104 often executes instructions in a particular programming language 110, such as Java, and the structure of the objects 108 in the application memory 106 is often defined by a language format 112 associated with the programming language 110. For example, Java programming language defines a set of primitive data types and the available set of properties of respective members that may be included in a class, and objects created by Java applications are formatted and stored in the application memory 106 in a digital byte sequence according to the language format 112 of objects 108 defined by Java programming language 110.

While the objects 108 are be rapidly and dynamically accessed in the application memory 106, the application memory 106 is often volatile; e.g., when the instance of the application 104 is terminated or the device 102 is reset, the application memory 106 is erased and the objects 108 stored therein are lost. In order to persist an object 108 beyond the termination of the instance of the application 104 and/or the resetting of the device 102, the application 104 may request to store respective objects 108 in nonvolatile storage 118, such as a platter of a hard disk drive, a solid-state storage device such as a flash drive, or a magnetic or optical disc. Accordingly, the application 104 initiates a store request 114 to store one or more identified objects 108 in the nonvolatile storage 118 (e.g., by invoking a "write" function of an application library or interface provided by the device 102). Similarly, the application 104 may invoke a retrieve request 112 in order to retrieve an object 108 persisted in nonvolatile storage 118. However, the device 102 may have difficulty storing the objects 108 in nonvolatile storage 118 according to the language format 112 for various reasons. As a first example, a first object 108 may include a member field storing a memory address of a second object 108 in the application memory 106, but the second object 108 may not be available at the same memory address when the first object 108 is later reloaded. If the objects 108 are directly stored in the nonvolatile storage 118 and later reloaded in the same state, the memory reference within the first object 108 may identify a different object 108, an unused region of memory, or a region that the first object 108 is restricted from accessing. As a second example, an object 108 may comprise resources that are not validly persisted, such as working objects granted by the device 102 to the application 104 on a temporary basis, and that are not valid when the object 108 is later reloaded. As a third example, a data structure of an object 108 (such as a linked list) may be fragmented and scattered within in the application memory 106, and it may be advantageous to reorder the data structure into a logical sequence.

In view of these and many other complexities, an object 108 is often reformatted by serialization 116 for nonvolatile storage 118. As one such example, the device 102 may convert respective member fields of the object 108 according to a storage format 120, such as an extensible markup language (XML) fragment that, in addition to the value or contents of the member field, describes the name, format, and state of the member field (e.g., "<member name='data_size' type='int' format='unsigned long' value='42' I>"). An automated serialization may be performed when the application 104 initiates the store request 114 for an object 108, and may convert the object 108 into the storage format 120 for writing to the nonvolatile storage 118. Similarly when the application 104 initiates a retrieve request 112 to retrieve an object 108 from nonvolatile storage 118, the device 102 may automatically perform a deserialization 124 of the object 108 from the storage format 120 into the language format 112 (e.g., reading the persisted representations of the member fields of the object 108 and composing the data structure of the object 108 suitable for the application memory 106), and may provide the converted object 108 in the language format 112 to the application 104 in order to fulfill the retrieve request 122. The serialization 116 and deserialization 124 thus enable the device 102 to fulfill requests from the application 104 to persist the objects 108 in nonvolatile storage 118. Similar processing may occur when the application 104 requests to send the object 108 to a remote data store over a network connection; e.g., the object 108 may be subjected to serialization 116 in order to package the object 108 for delivery over the network, and objects 108 received over the network may be subjected to deserialization 124 for provision to the application 104.

While the object access techniques illustrated in the exemplary scenario 100 of FIG. 1 provide some advantages, some disadvantages may also arise due to this architecture. As a first example, the serialization 116 and deserialization 124 involve a significant transformation of the object 108 that consumes computational resources and introduces a processing delay. For example, an application 104 that endeavors to interact with a large set of objects 108 in nonvolatile storage 118 may spend a significant amount of time on serialization 116 and deserialization 124, thus reducing the performance and capabilities of the application 104. As a second example, an application developer who provides custom logic for serialization 116 and deserialization 124 often has to understand the storage format 120 as well as the language format 112 of the application language 110. For example, the manner of querying the objects 108 stored in the application memory 106 (e.g., using the logic of the application language 110) may significantly differ from the manner of querying the same objects 108 when stored in the nonvolatile storage 118 (e.g., using an SQL query if the nonvolatile storage 118 comprises an SQL data store). As a third example, the application 104 may have to provide potentially extensive, device-specific logic contending with the details of the nonvolatile storage 118 (e.g., creating a file or database to persist the objects 108; file locks or unavailability; and synchronizing changes to the objects 108 in the object memory 106 and the serialized representations of the same objects 108 in nonvolatile storage 118). As a fourth example, evaluation of the objects 108 stored in nonvolatile storage 118 according to the storage format 120 may differ from evaluation of the same objects 108 stored in the application memory 106 (e.g., debugging techniques may have to distinguish between the different representations of the objects 108). Moreover, significant differences between the language format 112 and the storage format 120, or logical errors in the serialization 116 and/or deserialization 124, may result in variance between a first representation of an object 108 and a second representation of the same object 108 after serialization 116 and deserialization 124.

As a still further disadvantage, the storage of the objects 108 in nonvolatile storage 118 is often limited to an explicit store request 114 received from the application 104. If the application 104 does not explicitly initiate the store request 114 (either because some objects 108 are only deemed to be useful to the current instance of the application 104, or because the application 104 is terminated prior to the completion of a store request 114), non-persisted objects 108 are erased. Alternatively, the device 102 may be configured to store a representation of the entire bundle of objects 108 in the application memory 106 (e.g., a state save operation), possibly in the absence of an explicit request by the application 104. However, the bundle of objects 108 persisted in this manner is often usable only to restore the state of the application 104; i.e., the particular objects 108 of the bundle are not accessible. For at least these reasons, the storage of the objects 108 in the nonvolatile storage 118 may exhibit various disadvantages when persisted according to the techniques illustrated in the exemplary scenario 100 of FIG. 1.

B. Presented Techniques

In view of the potential disadvantages of the exemplary scenario 100 of FIG. 1, alternative techniques are provided herein for configuring a device 102 to access objects 108 on behalf of one or more applications 104. In accordance with these techniques, the objects 108 of the application are persisted as documents in a document store, and formatted according to the language format of the application language 110 of the application 104. For example, the JavaScript application language 110 includes a JavaScript Object Notation (JSON) language format 112, which uses the same formats, syntax, and access logic for JSON-formatted objects 108 as for the live objects 108 of the application 110. The storage of the objects 108 as documents in a JSON document store facilitates access of the objects 108 by other applications, as well as the efficiency of application interaction with the objects 108, objects portability, and the synchronization of the objects 108 with one or more remote devices. Additionally, the device 102 may be configured to store the objects 108 as documents in the document store not upon receiving an explicit store request 114, but upon receiving a request from the application 104 to create the object 108 in the application memory 106. Similarly, requests by the application 104 to update or delete the objects 108 in the application memory 106 may automatically result in an updating or deletion of the corresponding documents 108 in the document store; and requests by the application 104 to read an object 108 may be fulfilled by reading the corresponding document in the document store. These techniques therefore achieve an automated persistence and updating of the objects 108 natively used by the application 104, without the application 104 having to provide additional logic and express store requests 114 and retrieve requests 122 targeting the nonvolatile storage 118.

Figure 2:
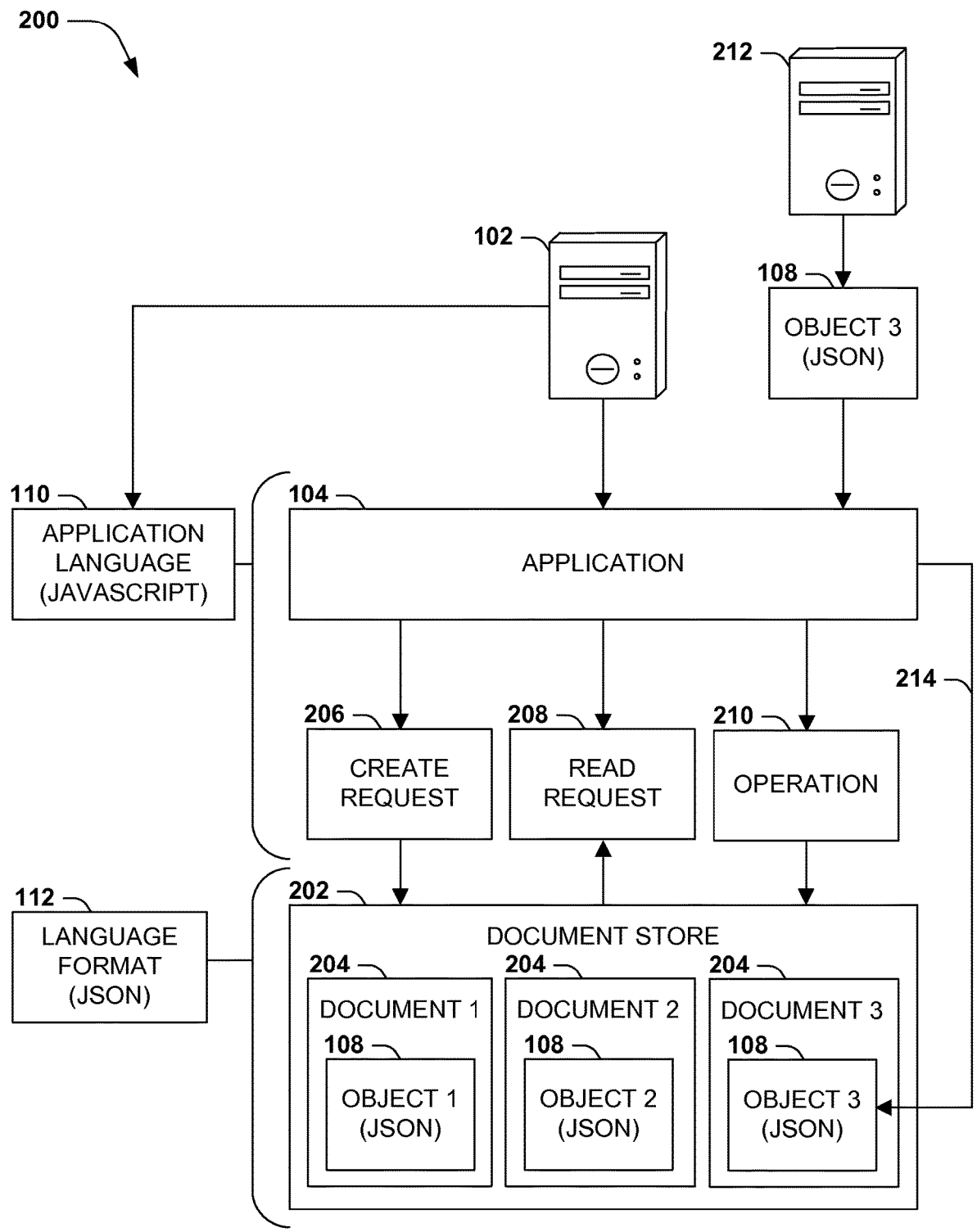
FIG. 2 is an illustration of an exemplary scenario featuring an application object architecture enabling the persistence of objects in a document store in accordance with the techniques presented herein.

FIG. 2 presents an illustration of an exemplary scenario 200 featuring an automated object persistence in an efficient and flexible manner. In this exemplary scenario 200, a device 102 executes an application 104 provided in an application language 110 (e.g., JavaScript), and interacts with a set of objects 108. However, in contrast with the exemplary scenario 100 of FIG. 1, in this exemplary scenario 200, the application 104 does not issue store requests 114 to store objects 108 in nonvolatile storage 118 through a serialization process 116, and retrieve requests 122 to retrieve the objects 108 from the nonvolatile storage 118 through a deserialization 124. Rather, the application 104 simply issues create requests 206 to create the objects 108; read requests 208 to read the objects 108; and operations 210 targeting various objects 108 (such as write requests, update requests, delete requests, and queries). The device 102 fulfills such requests by creating, reading, updating, and deleting documents 204 in a document store 202 storing representations of the objects 108. The device 102 may also create such objects 108 in an application memory 106 that is automatically kept in synchrony with the document store 202 (such that the application memory 106 may be viewed as an in-memory cache of the portion of the document store 202 storing the objects 108 of the application 104), or may omit the application memory 106 and enable access directly to the documents 204 and objects 108 stored in the document store 202.

As further illustrated in the exemplary scenario 200 of FIG. 2, the documents 204 in the document store 204 are formatted according to the language format 112 of the application language 110 (e.g., the documents 204 may store JSON-formatted objects 108). Because objects 108 formatted in the language format 112 are directly accessible to the application 104 through the application language 110, the serialization 116 and deserialization 124 of the objects 108 are considerably reduced, and in some cases eliminated. For example, when the application 104 receives a JSON-formatted object 108 from a remote device 212, the device 102 may directly store 214 the JSON-formatted object 108 as a document 204 within the document store 202 with little or no serialization 116 or other conversion. The object 108 is therefore stored in the document store 202, and exposed to the application 104, in the initially provided format. In addition to reducing the loss of information from conversion and the inefficiency of extensive serialization 116 into and out of a storage format 120, these techniques enable a continuous persistence of the objects 108 in the absence of store requests 114 initiated by the application 104. Additionally, the application 104 may reduce or omit the extensive logic relating to persistence, such as the location of the nonvolatile storage 118 and associated properties (e.g., file locks and synchronization mechanisms). As a further potential advantage, the application 104 may directly interact with the persisted objects 108, as the language format 112 is well-integrated with the application language 110. For example, queries specified in the application language 110 formulated against the objects 108 in an application memory 106 may also be applied to the objects 108 persisted in the nonvolatile storage 118. As a still further potential advantage, the objects 108 may be synchronized with other document stores 202 and/or exposed to other applications 104 and devices 104 in the native language format 112, and/or may be combined with objects 108 in the document store 202 created by other applications 104 and devices 102. For example, the document store 202 may be distributed across a range of devices 102 without significantly changing the interaction of the application 104 with the objects 108 stored therein. These and other advantages may be achievable through the object access architecture and techniques illustrated in the exemplary scenario 200 of FIG. 2 and as further provided herein.

C. Exemplary Embodiments

Figure 3:
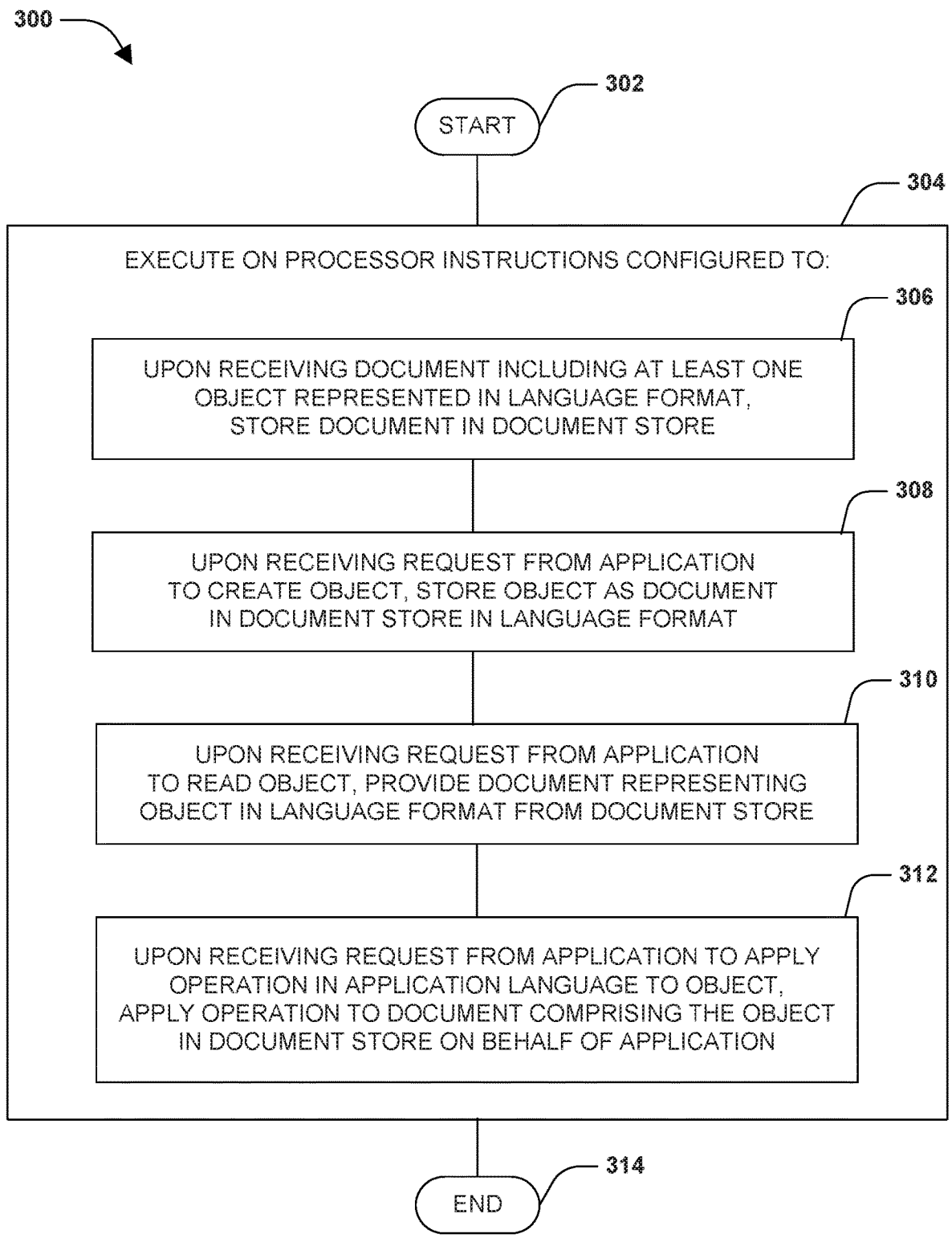
FIG. 3 is an illustration of an exemplary method of accessing objects on behalf of an application in an application language specifying a language format in accordance with the techniques presented herein.

FIG. 3 presents a first exemplary embodiment of the techniques presented herein, illustrated as an exemplary method 300 of accessing objects 108 on behalf of an application 104 in an application language 110 specifying a language format 112. The exemplary method 300 may be performed by a device 102 having a document store 202, and may be implemented, e.g., as a set of instructions stored in a memory component of the device 102, such as a memory circuit, a platter of a hard disk drive, a solid-state storage device, or a magnetic or optical disc, and organized such that, when executed the device, cause the device 102 to operate according to the techniques presented herein. The exemplary method 300 begins at 302 and involves executing 304 the instructions on a processor of the device. Specifically, these instructions may be configured to, upon receiving a document 204 including at least one object 108 represented in the language format 112, store 306 the document 108 in the document store 202. The instructions may also be configured to, upon receiving a create request 206 from the 104 application to create an object 108, store 308 the object 108 as a document 204 in the document store 202 in the language format 112. The instructions may also be configured to, upon receiving a read request 208 from the application 104 to read an object 108, provide 310 the document 204 representing the object 108 in the language format 112 from the document store 202. The instructions may also be configured to, upon receiving a request from the application 104 to apply an operation 210 in the application language 110 to an object 108, apply 312 the operation 210 to the document 204 comprising the object 108 in the document store 202 on behalf of the application 104. Having achieved the accessing and persistence of the objects 108 on behalf of the application 104, the exemplary method 300 achieves the techniques presented herein, and so ends at 314.

Figure 4:
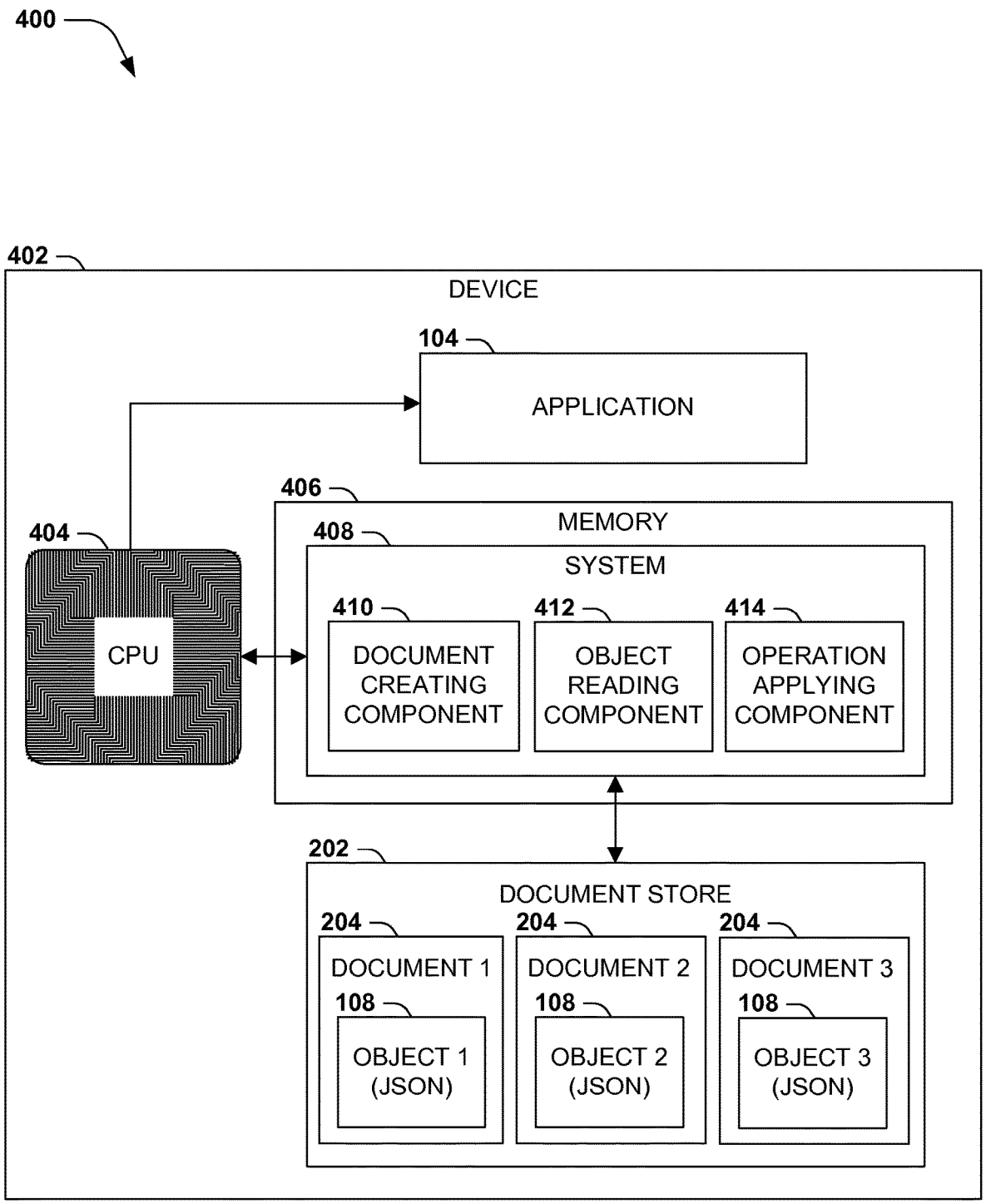
FIG. 4 is a component block diagram illustrating an exemplary system for accessing objects on behalf of an application in an application language specifying a language format in accordance with the techniques presented herein.

FIG. 4 presents a second exemplary embodiment of the techniques presented herein, illustrated as an exemplary scenario 400 featuring an exemplary system 408 configured to access objects 108 on behalf of an application 104. The exemplary system 408 may be implemented, e.g., as instructions stored in a memory 406 of the device 402 having a processor 404 and a document store 202, where the exemplary system 408 is configured to, when executed on the processor 404, cause the device 402 to operate according to the techniques presented herein. The exemplary system 408 comprises a document creating component 410 comprising instructions stored in the memory 406 that, when executed on the processor 404, cause the device 402 to, upon receiving a document 204 including at least one object 108 represented in the language format 112, store the document 204 in the document store 202; and, upon receiving a create request 206 from the application 104 to create an object 108, store the object 108 as a document 204 in the document store 202 in the language format 112. The exemplary system 408 also comprises an object reading component 412, comprising instructions stored in the memory 406 that, when executed on the processor 404, cause the device 402 to, upon receiving a read request 208 from the application 104 to read an object 108, provide the document 204 representing the object 108 in the language format 112 from the document store 202. The exemplary system 408 also comprises an operation applying component 414 comprising instructions stored in the memory 406 that, when executed on the processor 404, cause the device 402 to, upon receiving a request from the application to apply an operation 210 specified in the application language 110 to an object 108, apply the operation 210 to the document 204 comprising the object 108 in the document store 202 on behalf of the application 104. By providing access to the objects 108 in this manner, the exemplary system 408 achieves within the device 402 the application of the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
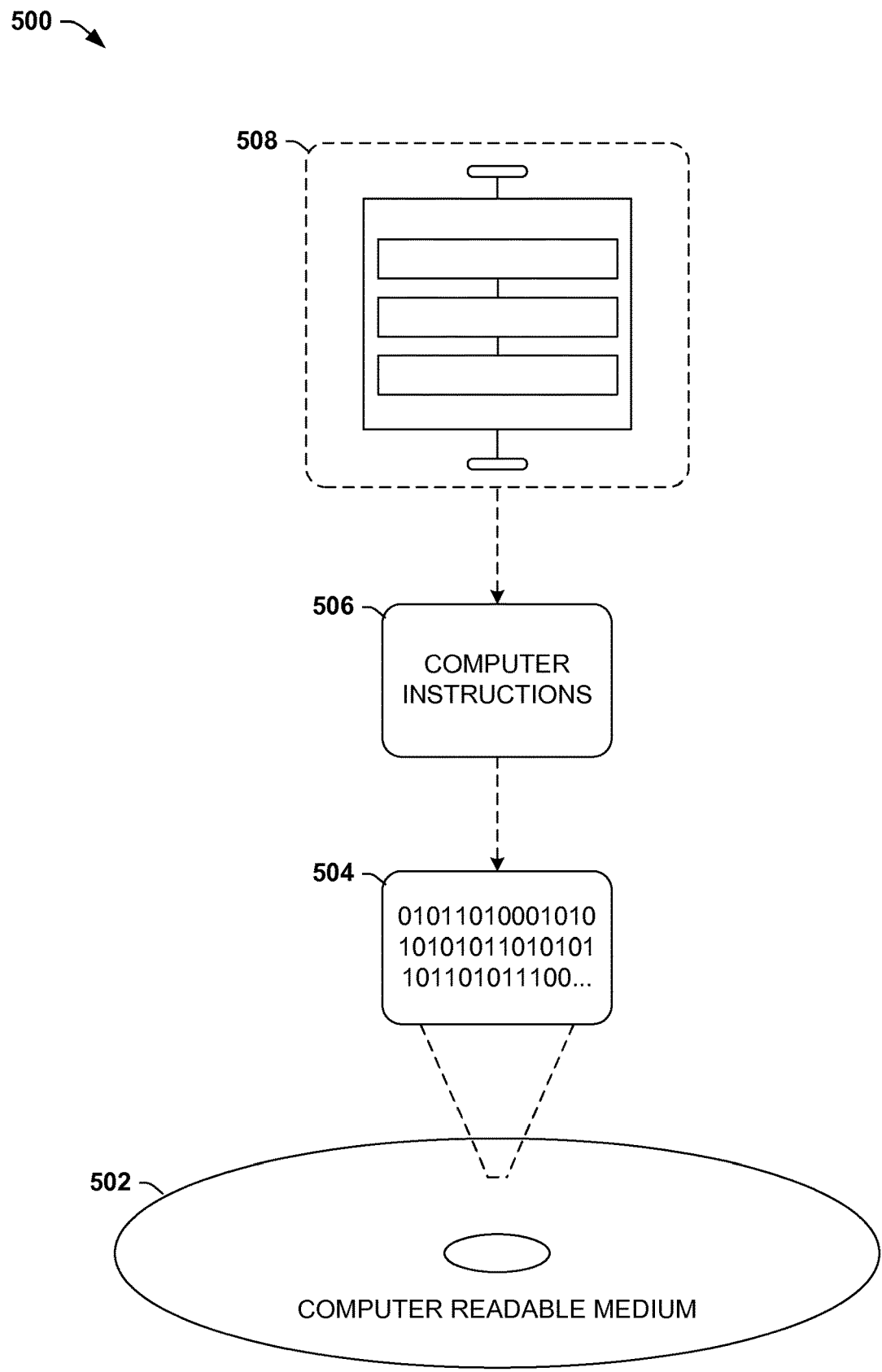
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method 508 of providing access to objects 108 on behalf of applications 104, such as the exemplary method 300 of FIG. 3. In another such embodiment, the processor-executable instructions 506 may be configured to implement a system for accessing objects 108 on behalf of applications 104, such as the exemplary system 408 of FIG. 4. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and the exemplary system 408 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of device 102, such as servers, server farms, workstations, laptops, tablets, mobile phones, game consoles, and network appliances. Such devices 102 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the techniques presented herein may be utilized with various types of applications 104, such as server applications, client applications, peer-to-peer applications, web applications, office productivity applications, information access applications, data analysis applications, utilities, games, operating system components, application programming interfaces (APIs), and hardware or software drivers. Additionally, such applications 104 may be provided in a variety of application languages 110, including low-level languages such as assembly encoded or machine instructions provided for a particular device 102; imperative, declarative, object-oriented, and/or aspect-oriented languages; and compiled and/or interpreted languages, such as scripting languages. Moreover, such application languages 110 may target a particular device 102 or architecture, such as a native application encoded according to the machine language of a particular device 102, architecture, or platform; may be specified according to a model environment, but compiled and/or interpreted according to the capabilities of a particular device 102, architecture, or platform; or may execute within a virtual environment, such as a web browser or a virtual machine. As one example, the application language 110 may comprise the JavaScript language.

As a third variation of this first aspect, the application 104 may interact with many types of objects 108, such as "object-oriented" objects respectively comprising a set of member fields; tuples comprising sets of related values; and records of a table in a database. Such objects 108 may present various types and degrees of structure, including completely unstructured data sets; low-level structures, such as key/value stores; and highly defined structures according to a class definition or a schema. Additionally, the structures of such objects 108 may be statically defined within the application 104; dynamically synthesized at runtime; inferred based on the contents of provided objects 108; and/or unresolved, such as in "duck typing" languages. As one example, the objects 108 may be formatted according to the JavaScript Object Notation (JSON) application format.

As a fourth variation of this first aspect, the documents 204 storing the objects 108 in the document store 202 may be structured in many ways. As a first example, respective documents 204 may store one object 108, a set of two or more related or unrelated objects 108, or a collection of objects 108. As a second example, the documents 204 may include only the at least one object 108, or may include metadata about the at least one object 108, such as an identifier of an object; the source, history, or version set of the object 108; the status of the object 108 with respect to the applications 104 and/or the devices 102, such as a lock status; relationships between and among the at least one object 108 with other objects 108 in the same or other documents 204; or an index of the contents of the at least one object 108, such as an index of the presence and values of inferred or specified fields or attributes of the at least one object 108. As a third example, the document store 202 may be structured in various ways, such as a file store comprising a set of human-readable or human-unreadable files, or a database server comprising a set of database tables representing the documents 204 and a set of database records representing the objects 108 within respective documents 204. As one example, the document store 202 may comprise a JSON document store, configured to store, access, and index documents 204 structured in the JSON application format.

As a fifth variation of this first aspect, the document store 202 may be included in the device 102 in various ways. As a first example, the document store 202 may comprise a portion of a general-use nonvolatile storage device, such as a portion of a hard disk drive reserved for the document store 202. As a second example, the document store 202 may be stored in a dedicated nonvolatile storage device, such as a hard disk drive or solid-state storage device used exclusively for the document store 202. As a third example, the document store 202 may be stored in a volatile memory device, such as a portion of system random access memory (RAM). As a fourth example, the document store 202 may be encapsulated in a subcomponent of the device 102, or in a separate device 102 that is accessible to the device 102 executing the application 104 (e.g., in a server farm, the application 104 may execute on a first server, the document store 202 may be provided on a second server, and the servers may be interconnected by a high-speed bus or network).

As a sixth variation of this first aspect, the application 104 may initiate many types of requests involving the objects 108 that may trigger various types of operations involving the documents 204 of the document store 202. As a first such example, the requests may include requests to create, read, update, and delete objects 108. As a second example, the requests may include the receipt of an object 108 from a remote data store 212, resulting in the storage as a new document 204 in the document store 202, and particularly in the same language format 112 in which the object 108 was received from the remote data store 212. As a third example, transactional interactions with the objects 108 may utilize the transactional capabilities of the document store 202; e.g., an operation 210 specified by the application 104 to be applied to several objects 108 in an atomic, consistent, and isolated, and durable manner may result in the invocation of a transaction in the document store 202 involving the corresponding documents 204, wherein a successful completion of the operation 210 may result in a commit of the transaction in the document store 202, and a failure during the operation 210 (such as a thrown exception) may result in a rollback of the transaction in the document store 202. These and other variations may be suitable for implementations of the techniques presented herein.

D2. Application Interaction

A second aspect that may vary among embodiments of the techniques provided herein involves the interaction of the application 104 and the document store 202.

As a first variation of this second aspect, the document store 202 may be stored only locally on the device 102, and may serve applications 104 provided therein. Alternatively or additionally, the document store 202 may be provided on a first device 102 to fulfill requests received from applications 104 executing on other devices 102. In one such scenario, the device 102 may include a webserver that is configured to provide access the document store 202 according to a representation state transfer ("RESTful") model. For example, the device 102 may provide one or more service uniform resource identifiers (URIs) wherein applications 104 may submit various requests involving the document store 202. Additionally, respective documents 204 in the document store 202 may be identified by a document uniform resource identifier, and may be so identified in a request submitted to the service uniform resource identifier. As a third example, the document store 202 may be distributed among the device 102 and at least one other device 102, wherein respective devices 102 store one or more documents 204 representing one or more of the objects 108 comprising the document store 202.

As a second variation of this second aspect, the application 104 may invoke the services of the document store 202 in various ways. In a first such scenario, the application 104 may be associated with a volatile memory of the device 102, and may expressly request interactions with the document store 202 in the form of store requests 114 and retrieve requests 122, resulting in the persistence of the objects 108 as documents 204 in the document store 202. In a second, alternative scenario, the application 104 may not expressly request interactions with the document store 202, and in some such scenarios may even be informed of the existence of the document store 202. Rather, the application 104 may simply initiate create requests 206 to create objects 108 in a memory space of the device 102, read requests 208 to read the objects 108 present on the device 102, and operations 210 to be performed on the objects 108 present on the device 102. These requests may be fulfilled by creating, reading, and applying operations 210 to documents 204 in the document store 202 that represent the objects 108 with which the application 104 interacts. That is, the requests to create objects 108 may be fulfilled through the creation of documents 204 in the document store 202, in the absence of a request by the application 104 to persist the objects 108 outside of the volatile memory associated with the application 104. These requests may be accompanied by the creation of corresponding objects 108 in a volatile memory of the device 102, such as an application memory 106 storing the objects 108 used by the application 104, and the objects 108 in the volatile memory may be maintained in synchrony with the objects 108 in the documents 204 of the document store 202 (such that the volatile memory represents a memory cache of objects 108 recently accessed by the application 104). Alternatively, the device 102 may refrain from allocating volatile memory for the application 104, and may represent the objects 108 of the application 104 only in the document store 202. A combination of these techniques may also be utilized, where some objects 108 associated with the application 104 are created only in volatile memory associated with the application 104.; other objects 108 associated with the application 104 are created only in the document store 202; and still other objects 108 associated with the application 104 are created in both the document store 202 and the volatile memory associated with the application 104.

As a third variation of this second aspect, the document store 202 may be provided exclusively for a particular application 104, such that the document store 202 only contains documents 204 storing the objects 108 associated with the application 104. Alternatively, the document store 202 may also include objects 108 and documents 204 associated with other applications 104 executing on the same device 102 and/or other devices 102. In such scenarios, the document store 202 may be configured to enable applications 102 to share some or all of the documents 204 and the objects 108 represented therein, or may restrict other applications 104 from accessing the documents 204 and objects 108 associated with the application 104, and/or vice versa. For example, the application language 110 may specify an application sandbox model, such as a set of privileges and restrictions for exposing the capabilities of the device 102 to an application 104 (e.g., based on a type, source, or trust level ascribed to the application 104), such as the JavaScript application sandbox model within which webservers execute JavaScript applications 104. The device 102 may therefore execute the application 104, including the operations 210 requested thereby, within the application sandbox model of the application language 110. For example, the device 102 may constrain the number, types, or sizes of objects 108 created by the application 104; may limit he types of operations 210 applicable thereto; and/or prohibit the operations 210 of the application 104 from causing a state change within the application sandbox that persists after completion of the operation 210.

As a fourth variation of this second aspect, the device 102 may provide the requests initiated by the application 104 to the document store 202 in various ways. For example, it may be advantageous for the device 102 to open a communication channel between the application 104 and the document store 202, and, in some cases, to maintain the channel in order to provide a stream of requests to the document store 202. Alternatively or additionally, it may be advantageous to provide the requests to the document store 202 in batches, e.g., by storing a set of requests received from the application 102, and occasionally applying the set of requests to the document store 202. These techniques may be particularly advantageous in scenarios such as the concurrent representation of the objects 108 in an application memory 108 and the document store 202; in scenarios involving a series of operations 210 applied to a particular object 108, such as repeated or intensive processing of a particular object 108; in scenarios involving bulk updates, such as the creation of a large number of new objects 108; in scenarios where several requests are related, such as a transaction; and in distributed scenarios where the requests may involve objects 108 represented in documents 204 that may be stored by a remote device 102.

Figure 6:
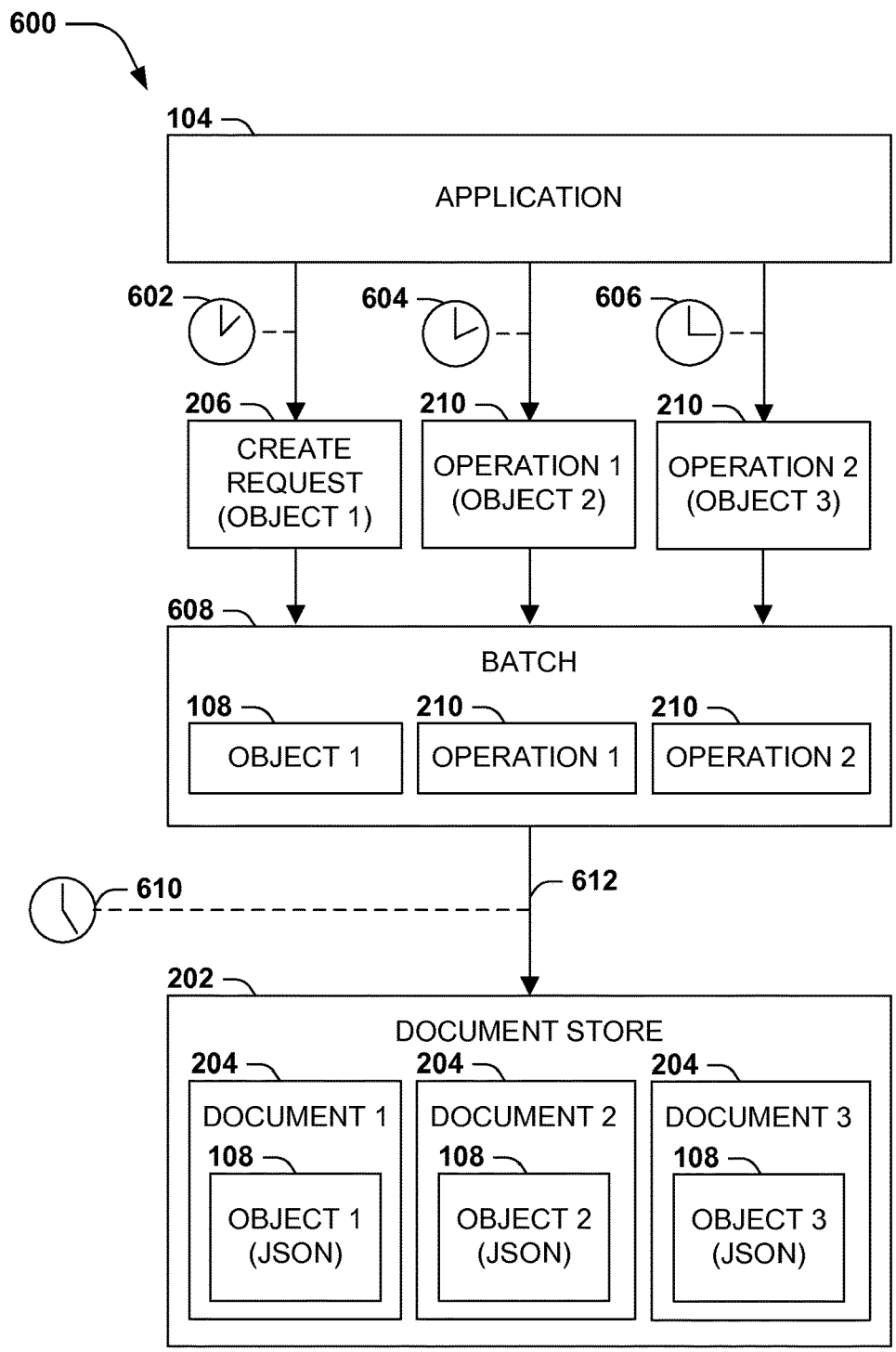
FIG. 6 is an illustration of an exemplary scenario featuring a batching of object updates for batch delivery to a document store.

FIG. 6 presents an illustration of an exemplary scenario 600 featuring a first such technique, wherein an application 104 generates a set of requests. For example, at a first time 602, the application 104 may initiate a create request 206 to create a first object 108; at a second time 604, a first operation 210 to be applied to one or more objects 108; and at a third time 606, a second operation 210 also to be applied to one or more objects 108. In this exemplary scenario 600, the device 102 stores the create request 206, the first operation 210, and the second operation 210 in a batch 608 of requests initiated by the application 104 (optionally including at least one other operation 210 to be applied to an object 108 in the document store 202). The device 102 may also apply the requests to the representations of the same objects 108 stored in an application memory 106 in order to enable the device 102 to continue processing; may hold the requests in the batch 608 for eventual application to the document store 202; or may block the application 104 in the interim. At a fourth time 610, upon receiving a batch commit request (e.g., an affirmative request generated by the application 104, the device 102, or a user; upon the batch 608 reaching a particular capacity; or upon an elapsed duration since applying a preceding batch 608), the device 102 may apply 612 the batch 608 of requests to the document store 202, e.g., by creating a new document 204 in the document store 202 representing the first object 108 and applying the operations 210 to the respective objects 108 and documents 204 in the document store 202.

Figure 7:
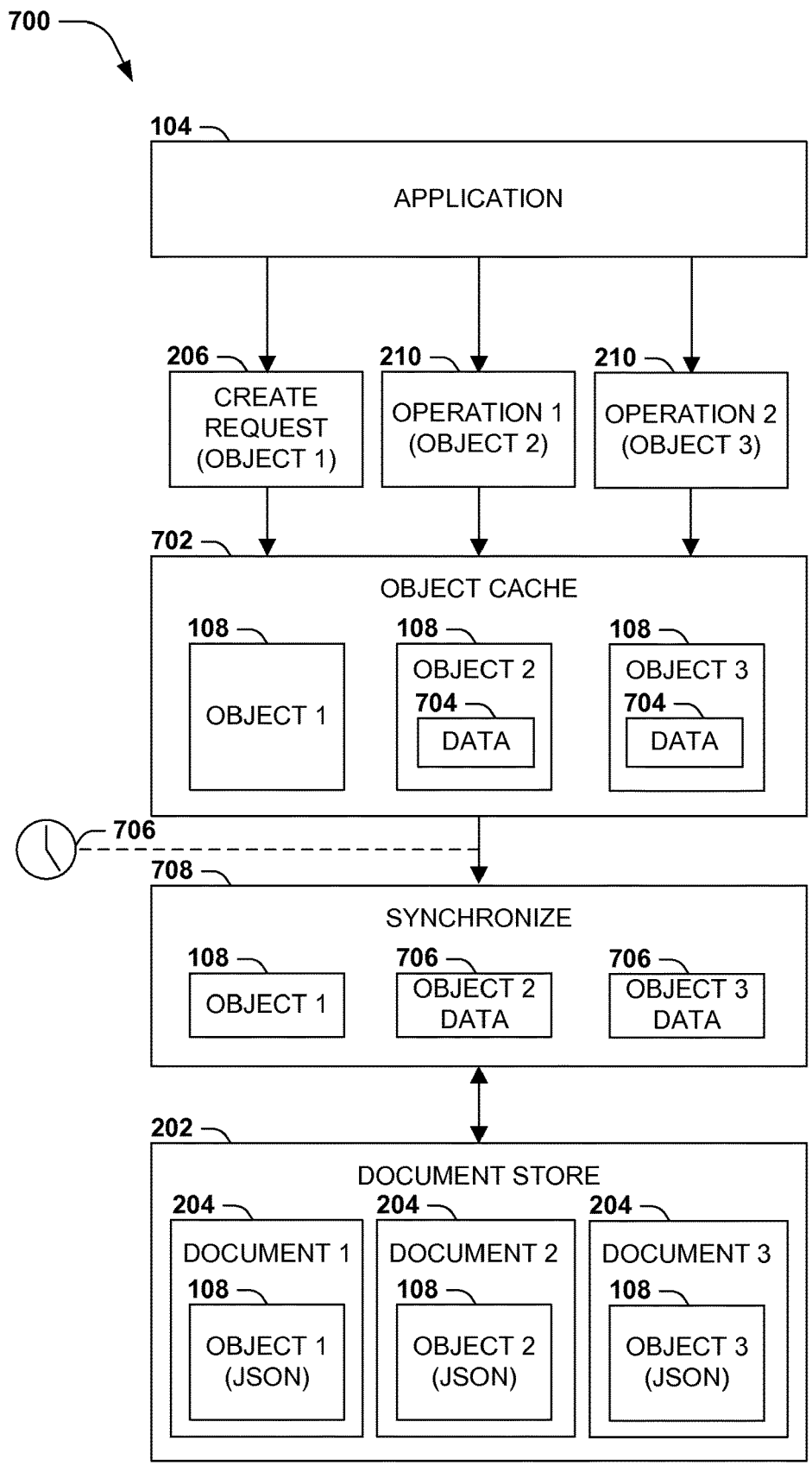
FIG. 7 is an illustration of an exemplary scenario featuring a synchronization of an object set in an application memory with a document store.

FIG. 7 presents an illustration of an exemplary scenario 700 featuring a second such technique, wherein the device 102 includes an object cache 702 storing a local representation of at least some of the objects 108 represented in the document store 202 on behalf of an application 104 (e.g., in an application memory 106 allocated in the system RAM of the device 102 for the application 104). At a first time, the application 104 initiates a set of requests including a create request 206 and a set of operations 210, the local representations of the objects 108 in the object cache 702 are updated (e.g., the create request 206 results in the creation of a new object 108 in the object cache 702, and the first and second operations 210 result in the creation or updating of data 704 in a second object 108 and a third object 108). At a second time 706 after the first time, the device 102 updates the document store 202 by performing a synchronization 708 between the local representations of the objects in the object cache 702 and the documents 204 representing the same objects 108 in the document store 202 (e.g., creating a new document 204 for the object 108 created by the create request 206, and copying the data 704 from the updated second object 108 and third object 108 into the corresponding documents 204 in the document store 204). In this manner, a set of requests initiated by the application 104 may be applied together to the document store 202.

As a fifth variation of this second aspect, a device 102 may enable one or more requests to be associated with an event arising within the object set, such that when the event arises, the requests are applied to the object set on behalf of the application 104. For example, upon receiving from the application 104 a request to associate an operation 210 with a particular event, the device 102 may store the operation 210 associated with the event; and upon detecting the event associated with the operation 210, the device 102 may, on behalf of the application 104, apply the operation 210 to one or more documents 204 in the document store 202 that represent one or more objects 108 associated with the event and/or the operation 210 (e.g., as an script or other type of operation 210 invoked as a "trigger" upon detecting the event). Many types of events may be associated in this manner, including user input events detected by the device 102; interactions with other devices 102; the performance of other operations 210 (e.g., a first operation 210 may be associated with a second operation 210, such that when the second operation 210 is applied to at least one object 108 of the document store 202, the first operation 210 is also applied to at least one object 108 of the document store 202); and an explicit request to invoke the operation 210 received from a user or application 104 (e.g., as a stored procedure that is stored by the device 102 and available for execution upon request). Additionally, the association of the operation 210 with the event may specify an execution order, such as a preceding execution order specifying the application of the operation 210 to the document store 202 before the event; a following sequential execution order specifying the application of the operation 210 to the document store 202 after the event; and a concurrent execution order specifying the application of the operation 210 to the document store 202 during the event. The device 102 may therefore apply the operation 210 to the document store 202 in accordance with the execution order specified with the association.

As a sixth variation of this second aspect, various architectures may be utilized in the application of one or more requests to the document store 202. For example, where an operation 210 involves one or more objects 108 represented in the document store 202 (such as a query over a defined set of objects 108), the objects 108 potentially involved in the operation 210 may be identified and retrieved from the document store 202; the operation 210 may be applied to the identified object set; and any changes to the object set may then be synchronized back with the document store 202, thus "bringing the objects to the code." Alternatively, one or more operations 210 may be provided to the document store 202 for application to the documents 204 and objects 108 represented therein, and any results of the operations 210 may be returned to the application 108, thus "bringing the code to the objects." For example, if the operation 210 comprises a query identifying at least one query criterion, the device 102 may retrieve at least one selected document 204 from the document store 202 that represents an object 108 satisfying the query criteria; may apply the operation 108 to the at least one selected document 204 to generate at least one query result; and may provide the query result to the application 104 in the language format 112. A combination of such techniques may be used in various circumstances (e.g., the former architecture may be utilized when a large number of operations 210 are applied to a small and well-defined set of objects 108, while the latter architecture may be utilized when an operation 210 is applicable to a large or indefinite set of objects 108). These and other techniques may be utilized in structuring the relationship between the application 104 and the document store 202 in accordance with the techniques presented herein.

D3. Distributed Document Store Variations

A third aspect that may vary among embodiments of these techniques relate to the application of such techniques to document stores 202 distributed over at least one remote data store, such as an interoperating set of devices 102 that each store, share, and provide a portion of the documents 204 comprising the document store 202. The distribution of the document store 202 may include various considerations, such as load balancing across the devices 102; redundancy in order to facilitate availability and fault tolerance; efficiency in routing and data access (e.g., enabling the devices 102 to determine which device 102 is responsible for storing a particular documents 204 efficiently and accurately); and allocation across the respective devices 102 based on the accesses of such documents 204 and objects 108 by the applications 104 executing thereupon. The device 102 may therefore send requests to a remote data store that is storing a portion of the document store 202 that is relevant to a request from an application 104. Additionally, the device 102 may satisfy requests received from a remote device that pertain to a portion of the document store 202 stored by the device 102 (e.g., upon receiving a request from a remote device on behalf of an application 104 executing on the remote device and involving a selected object 108, the device 102 may providing the document comprising the selected object 108 to the remote device).

As a first variation of this third aspect, respective requests generated by an application 104 may be automatically forwarded to one or more remote data stores that are responsible for storing one or more objects 108 involved in the request. As a first such example, requests to create objects 108 may be forwarded to a remote data store where such objects 108 are later to be found. As a second such example, a request by an application 104 to read an object 108 may involve sending the request to read the document comprising the object 108 to a remote data store, and upon receiving the requested document 204 from the remote data store, providing the object 108 represented in the requested document 204 to the application 104. As a third example, the application of an operation 210 to a selected object 108 may result in one or more results of the operation 210, which may be provided to the application 104 requesting the operation. As a fourth example, applying an operation 210 to a selected object 108 may involve sending the operation 210 to the remote data store storing the document 204 representing the selected object 108. That is, an embodiment of these techniques may, upon receiving a request to execute an operation 210, identify a remote data store that is storing one or more of the documents 204 representing the objects involved in the operation 210, and send the operation 210 for execution to the remote data store. Conversely, upon receiving an operation 210 from a remote data store to be applied to documents 204 included in the document store 202 on behalf of an application 104 executing on the remote data store, the device 102 may apply the operation 210 to the document store 202 on behalf of the application 104 and the remote data store. These techniques may enable low-latency compute for the operations by enabling the evaluation of the operation on the device 102 storing the documents 204 associated with the operation, rather than on a different device 102 that may involve extensive network transport. An exemplary scenario where such portability may be advantageous involves the application of a rigorous operation 210 to a large set of related documents 204, which, if evaluated on a device 102 that is not storing the documents 204, may involve significant volumes of network transport that significantly diminish the performance of the operation 210.

As a second variation of this third aspect, the device 102 may determine a remote data store storing a portion of the document store 202 associated with a request initiated by the application 104. As a first example, an operation 210 comprising a query may identify at least one query criterion involving an object set comprising at least one queried object 108. The device 102 may therefore select one or more selected remote data stores that each store at least a portion of the object set specified by the query criteria of the operation 210, and send the query to the at least one selected remote data store. As a second example, at least two remote data stores may store a replica of a selected object 108 that is involved in a request, and the device 102 may select one of the at least two remote data stores storing a replica of the selected object 108. The particular remote data store selected in this example may be selected in many ways (e.g., according to the current processing load of each remote data store, or according to a selection criterion specified by the operation 210).

Figure 8:
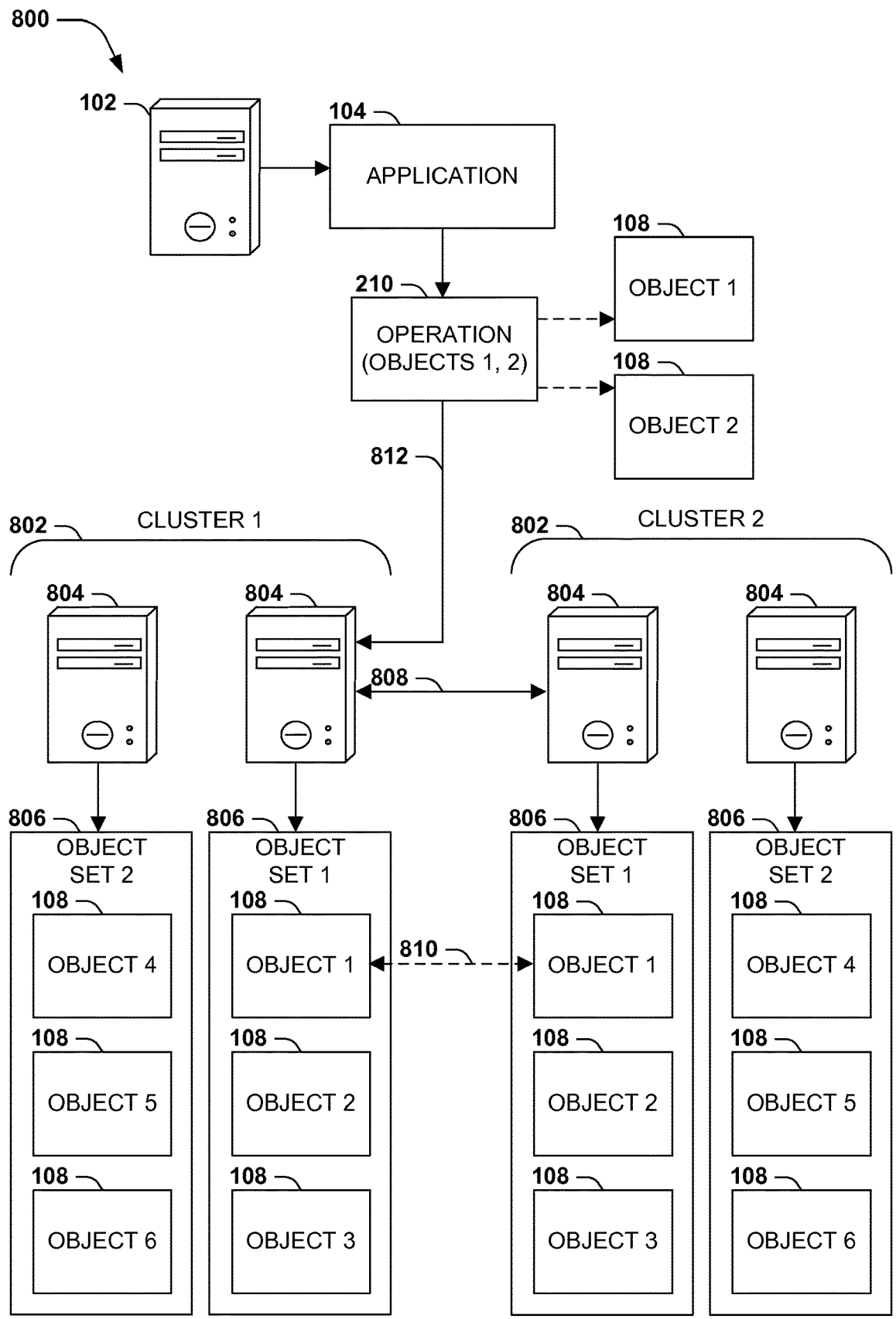
FIG. 8 is an illustration of an exemplary scenario featuring a selection of a remote data store among a set of remote data stores sharing a document set for application of an operation to an object set.

FIG. 8 presents an illustration of an exemplary scenario 800 involving the fulfillment of an operation 210 specifying two objects 108 represented in a document store 202 distributed over a set of remote data stores 804. In particular, the document store 202 may be divided into one or more object sets 806 involving subsets of related objects 108, and each object 108 of the document store 202 may be stored as at least two replicas 810 by different remote data stores 804. The clusters 802 may interoperate 808 to synchronize changes to the document store 202. Additionally, the remote data stores 804 may be divided into clusters 802, wherein each cluster 802 stores a complete copy of the document store 202, and each object set 806 may be stored by a particular remote data store 806. Accordingly, the device 102 executing the application 104 may identify that the operation 210 involves the objects 108 of a particular object set 806; may determine that replicas 810 of the objects 108 of the object set 806 are stored by at least two remote data stores 804; may select one of these remote data stores 804; and may send 812 the operation 210 to the selected remote data store 804 for processing. In this manner, the device 102 may fulfill the operation 210 requested by the application 104 in view of the properties of the distributed document store 202. These and other variations may be utilized to interface the application 104 with a distributed document store 202 in view of the techniques presented herein.

E. Computing Environment

Figure 9:
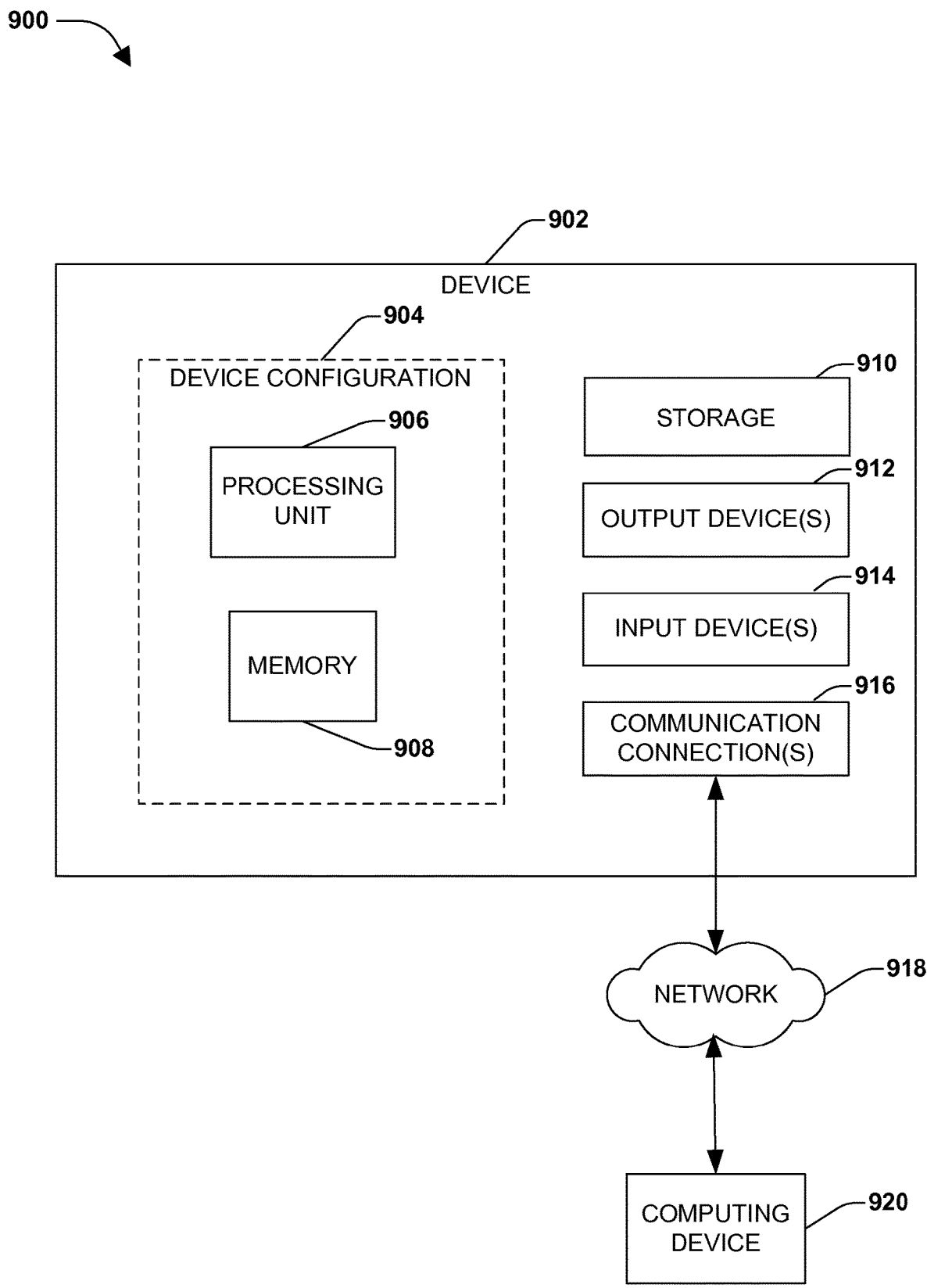
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of accessing objects in a document store on behalf of an application, the method involving a device having a processor and comprising:
   on condition of receiving a document including a representation of at least one object in a language format, storing the document in the document store including the representation of the at least one object in the language format;
   on condition of receiving a request from the application to create an object, creating, in the document store, a document including the representation of the object in the language format; and
   fulfilling respective requests from the application to access the object by applying the respective requests to the representation of the object in the language format in the document, by:
      on condition of receiving a request from the application to read the object:
         retrieving, from the document, the representation of the object, and
         providing the representation of the object to the application while maintaining the language format of the representation of the object; and
      on condition of receiving a request from the application to apply an operation to the object, applying the operation to the representation of the object while maintaining the language format of the representation of the object in the document stored in the document store.

2. The method of claim 1, wherein:
   the language format further comprises a JavaScript Object Notation (JSON) format; and
   the document store further comprises a JSON document store.

3. The method of claim 1, wherein:
   the application is associated with a volatile memory of the device; and
   the request to create the object refrains from including a request to persist the object outside of the volatile memory associated with the application.

4. The method of claim 1, wherein:
   requests from the application are to be executed within an application sandbox model; and
   applying the operation further comprises: executing the operation within an application sandbox for the application according to the application sandbox model.

5. The method of claim 4, wherein:
   the application sandbox model prohibits the operation from causing a state change within the application sandbox persisting after completion of the operation; and
   applying the operation further comprises: responsive to completion of the operation, restore an initial state of the application sandbox.

6. The method of claim 1, wherein:
   applying a first operation to the document comprising the object in the document store further comprises: storing the first operation in a batch comprising an operation set including the first operation and at least one other operation to be applied to an object in the document store; and
   the method further comprises: responsive to receiving a batch commit request, applying respective operations of the operation set comprising the batch to the representation of the object in the language format stored in the document in the document store.

7. The method of claim 1, wherein:
the representation of the object is also stored in a local object cache on the device; and
applying the operation to the object further comprises:
responsive to a request to apply an update to the object:
applying the update to the representation of the object in the local object cache on the device; and
synchronizing the representation of the object in the local object cache on the device with the document of the document store comprising the representation of the object in the language format.

8. The method of claim 1, further comprising:
responsive to a request from the application to associate the operation with an event, storing the operation associated with the event; and
applying the operation to the object further comprises:
responsive to detecting an instance of the event associated with the operation, applying the operation to the representation of the object in the language format in the document stored in the document store.

9. The method of claim 8, wherein:
the request to associate the operation with an event further specifies a second operation to be applied to the object; and
applying the operation to the object further comprises:
responsive to detecting an instance of the event, applying the second operation to the representation of the object in the language format in the document stored in the document store.

10. The method of claim 8, wherein:
the request further specifies an execution order with respect to the operation and the event, the execution order selected from an execution order set comprising:
a preceding execution order specifying applying the operation before handling the event;
a following sequential execution order specifying applying the operation after handling the event; and
a concurrent execution order specifying concurrently applying the operation concurrently with handling the event; and
applying the operation further comprises: applying the operation to the representation of the object in the language format in the document stored in the document store according to the execution order.

11. The method of claim 1, wherein:
the operation further comprises a query identifying at least one query criterion; and
applying the operation to the representation of the object further comprises:
retrieving at least one selected document from the document store respectively storing a representation of a matching object that satisfies the at least one query criterion;
applying the operation to the representation of the matching object in the language format in the respective at least one selected document to generate at least one query result; and
providing the query result to the application to fulfill the query.

12. The method of claim 1, wherein:
at least a portion of the document store is distributed over a remote data store;
creating the object in the document store comprising:
sending, to the remote data store, a request to create, in the remote data store, a document storing a representation of the object in the language format;
reading the object further comprises:
sending the request to read the object to the remote data store, and
upon receiving the document storing the representation of the object in the language format from the remote data store, providing the representation of the object in the language format to the application; and
applying the operation to the representation of the object further comprises: sending, to the remote data store, the request to apply the operation to the representation of the object stored in the document by the remote data store.

13. The method of claim 12, wherein:
the document store is partitioned over at least two remote data stores; and
sending respective requests involving the object further comprises:
among the at least two remote data stores, identifying a selected remote data store that stores the document storing the representation of the object; and
sending the request to the selected remote data store.

14. The method of claim 12, wherein:
the operation further comprises a query identifying at least one query criterion involving an object set comprising at least one queried object; and
sending the request to apply the operation further comprises:
selecting a selected remote data store storing at least a portion of the object set; and
sending the query to the selected remote data store.

15. The method of claim 14, wherein:
at least two remote data stores respectively store a document storing the representation of the object in the language format; and
selecting the selected remote data store further comprises:
selecting, from among the at least two data stores, one of the at least two remote data stores storing the document storing the representation of the object in the language format.

16. The method of claim 15, wherein:
the operation further specifies selection criterion for selecting one of the at least two remote data stores storing the document storing the representation of the object in the language format; and
selecting the selected remote data store further comprises:
selecting one of the at least two remote data stores storing the document storing the representation of the object, according to the selection criterion specified by the operation.

17. The method of claim 1, wherein:
the application is executing on a remote device;
respective requests are received from the remote device on behalf of the application; and
reading the representation of the object further comprising: transmitting the document storing the representation of the object in the language format to the remote device.

18. A device that accesses objects on behalf of an application, the device comprising:
a processor; and
a memory storing instructions that, when executed by the processor, provide a system comprising:
a document store that:
responsive to a document including at least one object represented in a language format, stores the document comprising the at least one object represented in the language format in the document store; and responsive to a request from the application to create an object, store a representation of the object in the language format as a document in the document store;

an operation accessor that fulfills respective requests from the application to access the object by applying the respective requests to the representation of the object in the language format in the document, by:

responsive to a request from the application to read the object:

retrieve, from the document, the representation of the object in the language format, and provide the document representing the object in the language format from the document store, while maintaining the language format of the representation of the object; and responsive to a request from the application to apply an operation to the object, apply the operation to the representation of the object in the language format in the document of the document store, while maintaining the language format of the representation of the object.

19. A device that accesses a representation of an object in a language format on behalf of an application operating in an application language, the device comprising:

a processor; and a memory storing instructions that, when executed by the processor, cause the device to:

responsive to a request from the application, in the application language to read the object:

retrieve, from a document in a document store, the representation of the object in the language format, and provide to the application the representation of the object in the language format, refraining from serializing the representation into the application language of the application; and responsive to a request from the application to apply an operation specified in the application language to the object:

apply the operation to the representation of the object in the language format of the document, while maintaining the language format of the representation of the object; and store the representation of the object, in the language format, in the document of the document store, while maintaining the language format of the representation of the object.

20. The device of claim 19, wherein executing the instructions further causes the device to:

provide the representation of the object to the application further comprises: refraining from serializing the document into the application language of the application; and apply the operation to the representation of the object further comprises: refraining from serializing the document into the application language to apply the operation to the representation of the object.

* * * * *